J. A. McELROY.
VALVE.
APPLICATION FILED JULY 16, 1910.
1,076,302.
Patented Oct. 21, 1913.
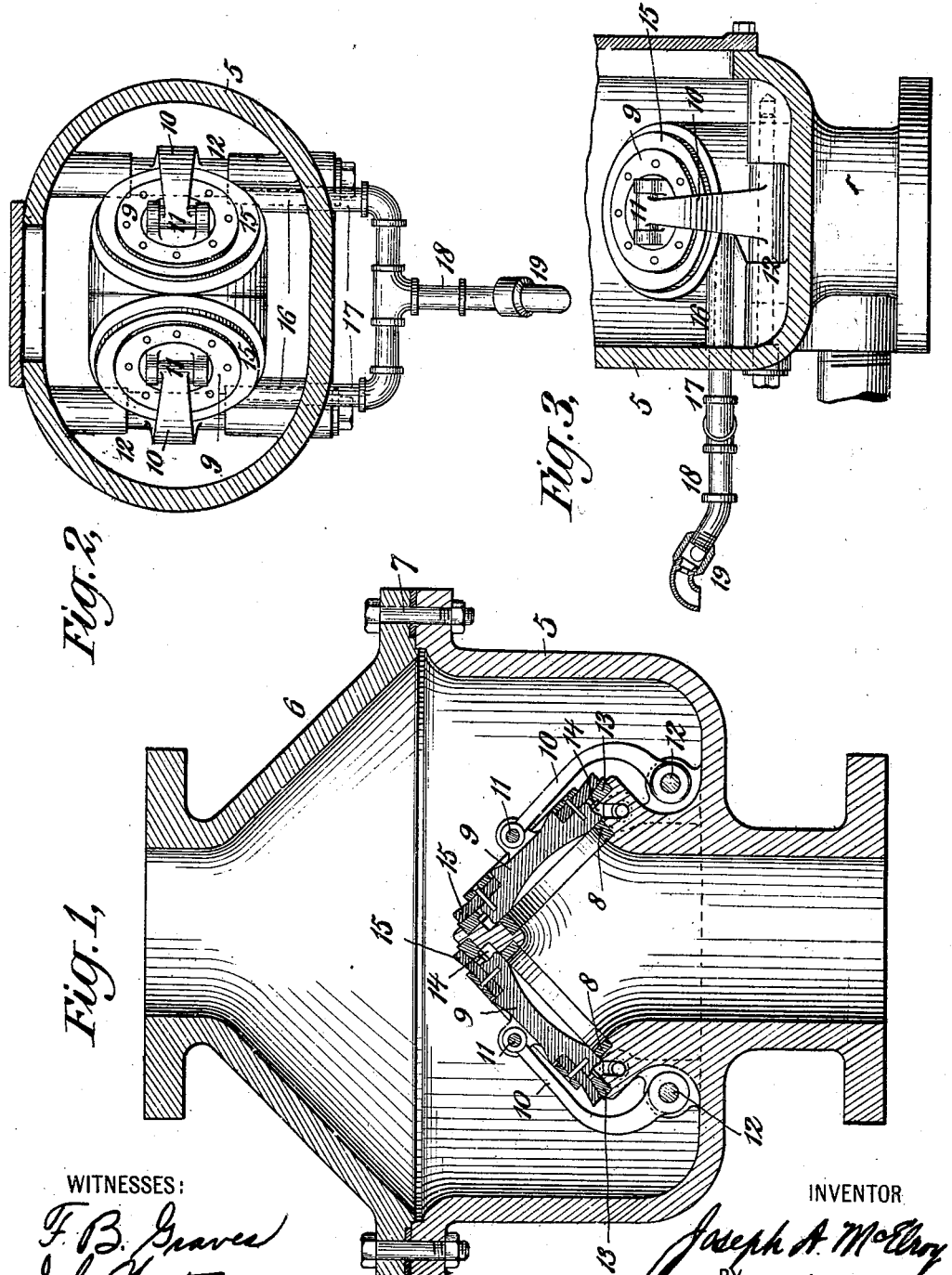
WITNESSES:
F. B. Graves
J. L. Hartmann
INVENTOR
Joseph A. McElroy
BY
Chapin & Wayford
his ATTORNEYS

UNITED STATES PATENT OFFICE.

JOSEPH A. McELROY, OF NEW YORK, N. Y.

VALVE.

1,076,302.

Specification of Letters Patent.

Patented Oct. 21, 1913.

Application filed July 16, 1910. Serial No. 573,239.

*To all whom it may concern:*

Be it known that I, JOSEPH A. MCELROY, a citizen of the United States of America, and a resident of New York, county and State of New York, have invented certain new and useful Improvements in Valves, of which the following is a specification, reference being had to the accompanying drawings, forming a part thereof.

My invention relates to improvements in valves, and particularly to improvements in valves for fire extinguisher systems.

In the class of fire extinguisher systems referred to there is a pipe line having a valve therein at one point, water under pressure being contained in the pipe line up to the valve, and air under pressure being contained in the pipe line upon the other side of the valve, the valve being kept normally closed by the superior pressure of the air but adapted to be opened by the water when the air pressure is relieved, as by the blowing of a fuse, so that at such times water will rush through that portion of the pipe normally containing air only and so to the sprinklers. In such form of valve it is exceedingly important that water be prevented from leaking into the portion of the pipe system which, for convenience, I will term the air pipe, first, because a hydrostatic column of sufficient height might be formed such as would prevent the opening of the valve upon the release of air pressure; and second, as a portion of the air pipe is often located at the exterior of a building or in some part of the building which is not heated, the water might freeze in the pipe and so lock up the entire system.

With the foregoing in view I have designed a form of valve in which should leakage occur as a result thereof the water will not be permitted to collect in the air pipe but will be carried away. Furthermore, in being thus carried away there is a sure indication that a leakage exists and which may thus be promptly attended to.

My invention also consists in a double form of valve, one portion of which opposes the flow of water, and the other the flow of air, and in certain other details of construction and novel combinations of parts, such as will be fully pointed out hereinafter.

In order that my invention may be fully understood, I will now proceed to describe an embodiment thereof, having reference to same, and will then point out the novel features in the claim.

In the drawings: Figure 1 is a view in central vertical section through a valve constructed in accordance with my invention. Fig. 2 is a view in horizontal section through the valve casing, and Fig. 3 is a detail view in vertical section through the valve casing, the point of view thereof being at right angles to the point of view of Fig. 1.

The casing of the valve in the form shown herein comprises two portions 5 and 6 secured together by bolts 7 which pass through flanges with which the said portions are provided, the upper and lower extremities of the said casing portions being provided with flanges to which the air pipe and water pipes may be secured. The lower casing portion is provided with two corresponding valve seats 8—8 arranged at an angle to the horizontal and to each other, and valve members 9—9 are fitted thereto. These valve members are conveniently connected by links 10—10 to the casing portion 5, being pivotally connected at 11—11 to the upper end of the links, the said links being in turn pivotally connected at their lower ends 12—12 to the base of the casing portion 5. In addition to the valve seats 8—8 the said casing portion 5 is also provided with two other valve seats 1°—13 disposed respectively above and preferably on a plane substantially parallel with the said valve seats 8—8 and concentric therewith. The two valve seats 8—13 are in each instance separated by means of an annular chamber 14, the inner wall of which is provided by the periphery of its valve member 9 and each of the valve members 9 is provided with a flexible annular disk 15 conveniently of rubber or rubber composition adapted for engagement with the said valve seats 13—13 and which constitutes a secondary valve. The valve seats 13—13 may be, and preferably are, composed of block tin or some such material as will in its co-action with the secondary valve elements 15—15 avoid any tendency to corrosion between them and prevent such sticking as commonly occurs between rubber and iron, for instance. As will be seen, the point of connection of a link 10 with the casing (the pivot point 12) is entirely below a line corresponding to the plane of the seating face for the lower valve. By this arrangement, and the fact that this permits of the link length, there is provided a construction by which the valve has but a relatively short movement on the pivot 12 before the center of gravity of the valve is shifted from one side to the other of the pivot 12, resulting in quickly placing the valve in a position where it will not return to its seat by gravity, therefore permitting the water to be discharged through the valve seat in an entirely unrestricted manner.

The flexibility of the secondary valves 15 will permit the proper seating of the two valve elements 9 and 15 upon their respective seats, while the valve element 15 is of such a nature as is effective to prevent the passage of air past it when it is closed to its seat, the valve element 9 being in turn of a suitable nature to prevent the passage of water past it when it is closed.

The two annular channels 14—14 are provided with connections 16—16 arranged in turn for connection with the branches 17—17 of a drain pipe 18. At its outer extremity the drain pipe 18 is provided with a ball valve 19 such as will normally tend to open by gravity when no water is wasting therethrough or when a small quantity of water is wasting therethrough, but on the other hand will be closed by a rush of water through the pipe should water in any considerable quantity attempt to discharge therethrough.

The operation of the valve is as follows: The normal position of the valve parts is that shown in the drawings, the valve pipe and a portion of the casing above the valve element containing air under pressure while the water pipe and a portion of the casing beneath the valve elements are connected with a water supply and contain water under a pressure somewhat less than the pressure of the air in the pipe. The valve elements 9—9 in engaging their seats 8—8 close the air pipe against admission of water thereto while the coaction of the flexible valve disks 15—15 with their seats 13—13 prevents the escape of air from the air pipe to the water pipe. Any slight leakage of water past the water valves will be drained through the channels 14 and the drain pipe 18 so that should any water leak past the water valves it will not be permitted to accumulate in the air pipe. Under fire conditions the air pressure is relieved in the air pipe and the water in the water pipe immediately forces the valves open, the said valves being thrown back upon the outer walls of the lower casing portion, the pivoted links 10 permitting such movements freely. The water will now rush from the water pipe into the air pipe and at the same time it will attempt to rush through the drain pipe, but the quantity of water and the speed at which it flows will be such that the ball 19 will be swept along with it whereby the end of the drain pipe will be closed so as to prevent escape of water at this point and all the water rushing from the water pipe will flow through the air pipe.

I find it convenient under ordinary circumstances to maintain a little water in the valve casing above the valves, that is to say, enough water may be contained in the valve casing to cover the valve elements. This is advantageous for several reasons, first, it helps to keep the rubber elements in good condition; second, it helps to maintain a tight joint between the rubber valve elements and their seats; and third, should there be a leak past the rubber valve elements the effect will be to discharge this water through the drain pipe and by so doing will indicate to the attendants that the leakage exists, which should be attended to. Such an indication also results, of course, if any water leaks past the water valves or either of them.

What I claim is:

A valve for dry-pipe fire extinguisher systems comprising a casing forming a water connection at the bottom and an air connection at the top in alinement with the water connection, and an intermediate chamber; two sets of oppositely and upwardly inclined valves, each set comprising a pair of annular seats of different diameters in different parallel planes with a drainage chamber formed between the seats and between said planes, the seats in one set meeting the seats in the other set centrally in respect to said connections and said chamber, and independent valve members, pivots therefor near the bottom of the casing and below the lower edges of any of the seats permitting the valve members to swing open independently, and links swinging on said pivots and pivotally connecting with the valve members.

JOSEPH A. McELROY.

Witnesses:
D. HOWARD HAYWOOD,
LYMAN S. ANDREWS, Jr.